(12) United States Patent
Fuse

(10) Patent No.: US 7,280,255 B1
(45) Date of Patent: Oct. 9, 2007

(54) IMAGE FORMING APPARATUS

(75) Inventor: Hiroyuki Fuse, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 695 days.

(21) Appl. No.: 09/671,153

(22) Filed: Sep. 28, 2000

(51) Int. Cl.
*H04N 1/40* (2006.01)
*G06K 15/00* (2006.01)

(52) U.S. Cl. .................. 358/3.28; 358/1.13; 358/1.18

(58) Field of Classification Search .............. 358/3.28, 358/3.29, 530, 540, 1.9, 401; 713/179
See application file for complete search history.

(56) References Cited

U.S. PATENT DOCUMENTS

| | | | | |
|---|---|---|---|---|
| 5,247,434 A | * | 9/1993 | Peterson et al. ............. | 700/83 |
| 5,257,119 A | | 10/1993 | Funada et al. ............... | 358/438 |
| 5,465,161 A | | 11/1995 | Funada et al. ............... | 358/438 |
| 5,671,277 A | * | 9/1997 | Ikenoue et al. .............. | 713/179 |
| 5,719,681 A | * | 2/1998 | Sasanuma et al. .......... | 358/296 |
| 5,737,100 A | * | 4/1998 | Funada et al. ............... | 358/501 |
| 5,742,408 A | | 4/1998 | Funada et al. ............... | 358/501 |
| 5,796,936 A | * | 8/1998 | Watabe et al. ............... | 358/1.9 |
| 5,936,741 A | * | 8/1999 | Burns .......................... | 358/1.9 |
| 6,646,764 B1 | * | 11/2003 | Wataya ....................... | 358/3.28 |

FOREIGN PATENT DOCUMENTS

| | | |
|---|---|---|
| JP | 4-294682 | 10/1992 |
| JP | 10-271318 | 10/1998 |

\* cited by examiner

*Primary Examiner*—Douglas Q. Tran
*Assistant Examiner*—James A. Thompson
(74) *Attorney, Agent, or Firm*—Foley & Lardner LLP

(57) ABSTRACT

An image forming apparatus forms an image on an image forming medium and can form a specific hidden pattern for specifying a body of an apparatus at a predetermined position of the medium. A hidden pattern addition mechanism uses both a software control signal which is generated by software and a hardware control signal which is generated by hardware and must be used for forming the image on the medium as control signals for adding the specific hidden pattern when the specific hidden pattern is added to a specific position of the medium to form the image.

17 Claims, 5 Drawing Sheets

IMAGE FORMING APPARATUS

BACKGROUND OF THE INVENTION

The present invention relates to a color image forming apparatus such as a plain paper copy machine (which will be abbreviated as PPC—Plain Paper Copy machine—hereinafter) or a printer which prints and records on an image forming medium such as plain paper or a transparency (such as an OHP—OverHead Projector—) sheet image data supplied from an image information supplying apparatus such as a personal computer (which will be abbreviated as PC—Personal Computer—hereinafter) or a digital camera or image data read by an image input apparatus. More particularly, the present invention relates to a color image forming apparatus which adds a specific hidden pattern when a color image is formed on the image forming medium.

Here, the specific hidden pattern means a pattern inherent to a color image forming apparatus, with which the color image forming apparatus which has printed using a specific color that is hard to be identified by the naked eye, for example, a color material of yellow can be specified with respect to not only an image that must not be reproduced but all the reproduced images in order to specify a color image reproducing apparatus from the reproduced images printed on a medium even if a specific original which must not be essentially printed (reproduced), e.g., bank bills or marketable securities is printed.

Conventionally, in the image forming apparatus for adding a specific hidden pattern, a hidden pattern must be added in case of inputting a usual original to output an image. In case of outputting a test pattern in a test mode and the like used for, e.g., adjusting the image forming apparatus, however, a problem occurs during adjustment if a hidden pattern using a color material of, e.g., yellow is added. Adding no specific hidden pattern may be convenient in terms of adjustment in some cases. Therefore, when a test pattern is outputted from the image forming apparatus, control is carried out so as not to add a specific hidden pattern.

FIG. 1 is a block diagram showing a structure of a conventional hidden pattern addition mechanism in a color image forming apparatus. In FIG. 1, the conventional hidden pattern addition mechanism is constituted by a specific pattern generation portion 1 for generating a specific pattern; a first register 2 for generating a signal "0x00" (hexadecimal) as an addition prohibition signal directing to inhibit printing a specific hidden pattern on an output image; a second register 3 for generating by software a specific pattern addition signal as a control signal for adding a specific pattern; a selector 4 for respectively inputting the specific pattern signal as an input X, the signal "0x00" as an input Y and the specific pattern addition signal as a selective control input S to supply a specific hidden pattern from an output Q; and an adder 5 for receiving yellow image data as an input A and the output Q of the selector 4 as an input B.

In the conventional hidden pattern addition mechanism shown in FIG. 1, the specific pattern generation portion 1 generates a specific hidden pattern; the register 2 generates by software the signal "0x00" as the addition prohibition signal directing to prohibit printing of a specific hidden pattern on an output image; and the register 3 generates by software the specific pattern addition signal as a control signal. These signals are respectively supplied to the selector 4. The selector 4 selects a signal level of the inputs X and Y based on a signal level of the selected signal and outputs the selected signal to the adder 5. The adder 5 adds, e.g., a yellow signal of the inputted image data as the input A and the output of the selector as the input B to output "A+B" to a printer engine. If a specific pattern for printing a specific hidden pattern is included in the input B, the hidden pattern is printed on the image forming medium at a predetermined position.

In this manner, in the conventional mode by which a hidden pattern is not added only when a test pattern is outputted from an apparatus for adding a specific hidden pattern, a control signal which is set by, e.g., the second register 3 and generated by software is used as a control signal indicating whether a specific hidden pattern is added.

With such a control signal generated by software, however, a problem is necessarily generated even if verification of the software is performed in detail. A specific hidden pattern cannot be added due to this problem when usual printing is made, and an image alone may be possibly printed and outputted.

In such a situation, the image forming operation is an erroneous operation. Further, when a color image forming apparatus is used for precise forgery of bank bills or marketable securities, the image forming medium on which an image having no hidden pattern added thereto is formed getting into circulation is not preferable in the social system and the legal system despite the fact that addition of a hidden pattern is obligate in order to specify an apparatus.

SUMMARY OF THE INVENTION

In view of the above-described problems, it is an object of the present invention to provide a color image forming apparatus which does not output a hidden pattern in forming an image such as a test pattern to be processed by software and which can assuredly add a hidden pattern to an image in forming usual image data to be supplied by hardware.

To this end, a color image forming apparatus according to the present invention uses not only a control signal by software as a control signal for adding a specific hidden pattern but also a signal by hardware as a control signal which must be used for forming a color image on an image forming medium, when a color image is formed on the image forming medium by adding a specific hidden pattern in the color image forming apparatus.

In one embodiment, the color image forming apparatus comprises: image data supplying means for supplying color image data; data existence/absence confirming means for confirming whether the image data exists in an image forming apparatus; hardware control signal supplying means for supplying a hardware control signal based on the existence/absence of the image data confirmed by the confirming means; software control signal supplying means for supplying a software control signal for adding a specific hidden pattern; control signal synthesizing means for synthesizing a control signal in such a manner that the specific hidden pattern is necessarily formed on a color image when a usual image is formed on the image forming medium based on the hardware control signal and the software control signal; hidden pattern generating means for generating the specific hidden pattern; test pattern generating means for generating and outputting a test pattern when no color image is formed; pattern selecting means for selecting and outputting one of the specific hidden pattern and the test pattern based on the control signal synthesized by the control signal synthesizing means; and image formation output signal synthesizing means for outputting the color image data supplied from the image data supplying means and the specific hidden pattern selected by the pattern selecting means when the image data is inputted and for outputting the test pattern selected by the selecting means when the color image data is not inputted.

The hardware control signal necessarily used for usual printing described herein means a signal which controls whether or not the specific hidden pattern is to be added and also controls to prevent a usual image from being formed when this signal is abnormal. Therefore, even if information which can be the basis for generation of this signal is set by software, the term "hardware control signal" is used for explanation in this specification.

With the above-described structure and operation, according to the color image forming apparatus of the present invention, since it is possible to output a control signal by which a specific hidden pattern which is obliged to be necessarily added when a color image is formed can be assuredly added based on existence of color image data, the specific hidden pattern can be surely added to the color image.

DESCRIPTION OF THE EMBODIMENTS

A preferred embodiment of an image forming apparatus according to the present invention will now be described in detail hereinafter with reference to the accompanying drawings. Before explaining a concrete embodiment, a basic concept of the present invention will be first described in conjunction with FIG. 2.

Figure 1:
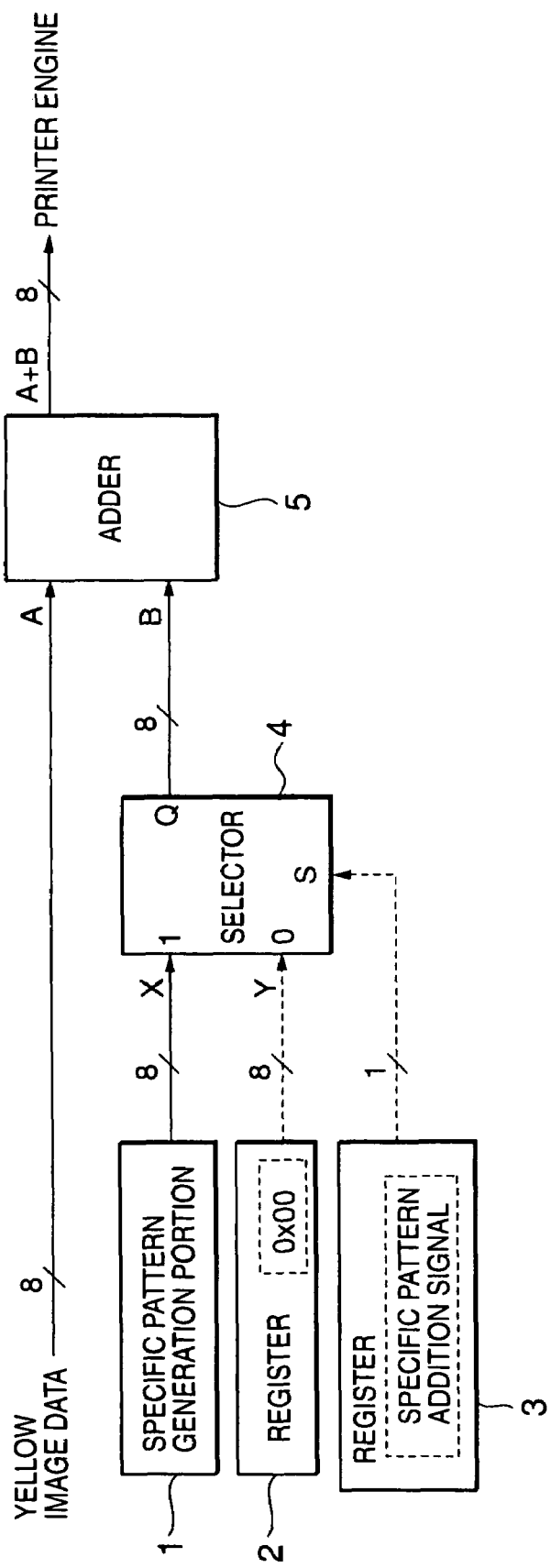
FIG. 1 is a block diagram showing a schematic structure of a specific hidden pattern addition mechanism in a prior art color image forming apparatus.
Figure 2:
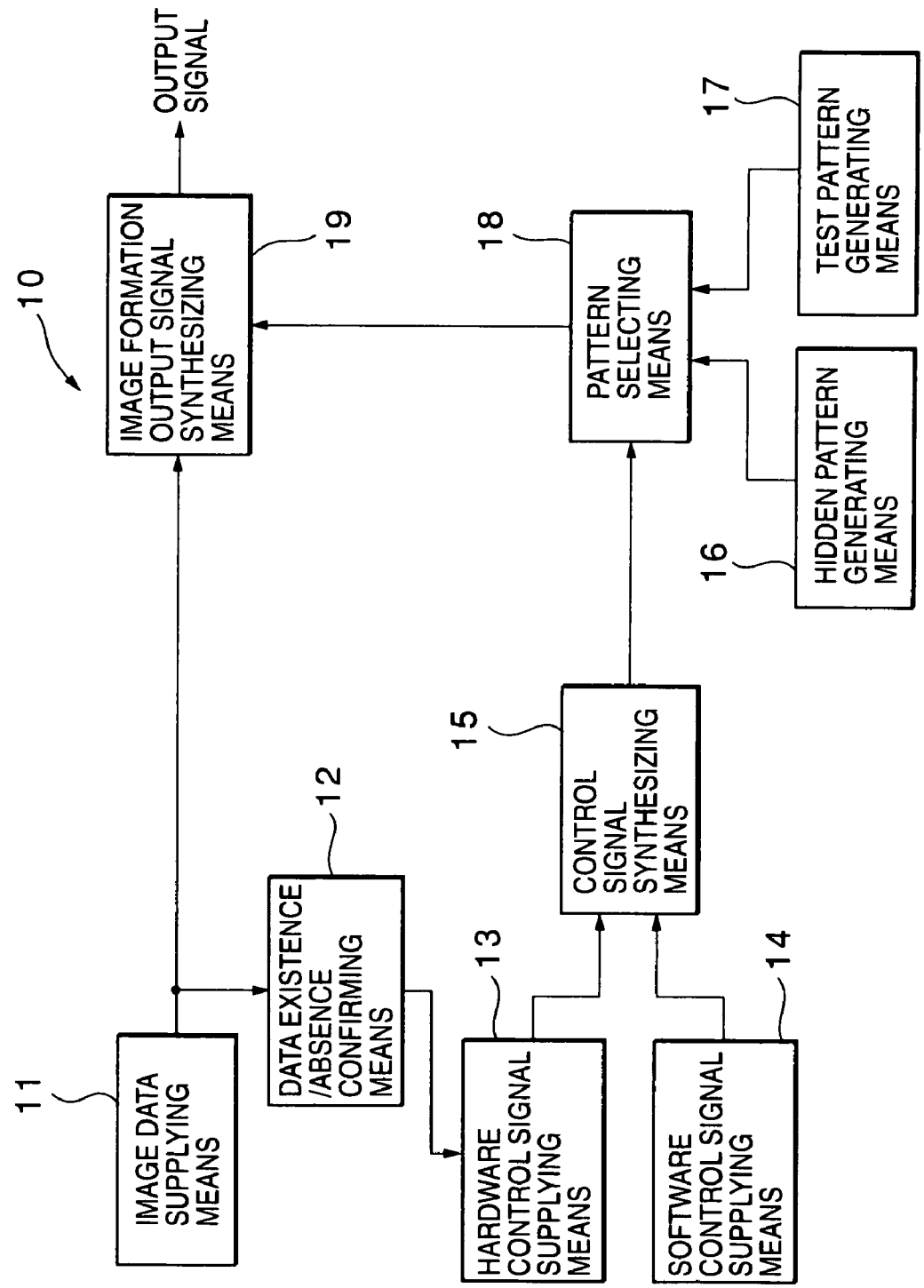
FIG. 2 is a block diagram showing a schematic structure of a hidden pattern addition mechanism in a color image forming apparatus according to a first embodiment as a basic concept of the present invention.

FIG. 2 is a block diagram showing a schematic structure of a color image forming apparatus according to a first embodiment as a basic concept of the present invention. In FIG. 2, a hidden pattern addition mechanism 10 includes: image data supplying means 11 for supplying color image data; data existence/absence confirming means 12 for confirming the existence/absence of image data; hardware control signal supplying means 13 for generating and supplying a hardware control signal representing that data exists when the color image data is supplied and exists in the image forming apparatus; software control signal supplying means 14 for generating and supplying a software control signal for determining whether a specific hidden pattern is added to a color image; control signal synthesizing means 15 which is formed by, e.g., a logical operation circuit and synthesizes a control signal by which a specific hidden pattern is necessarily formed to an output image when one of the hardware control signal and the software control signal exists; hidden pattern generating means 16 for generating a specific hidden pattern; test pattern generating means 17 for previously generating a test pattern; pattern selecting means 18 for selecting one of the hidden pattern and the test pattern based on the control signal synthesized by the control signal synthesizing means 15; and image formation output signal synthesizing means 19 for outputting to, for example, a printer engine an output signal obtained by combining the color image data supplied from the image data supplying means 11 and any pattern selected by the pattern selecting means 18.

Figure 3:
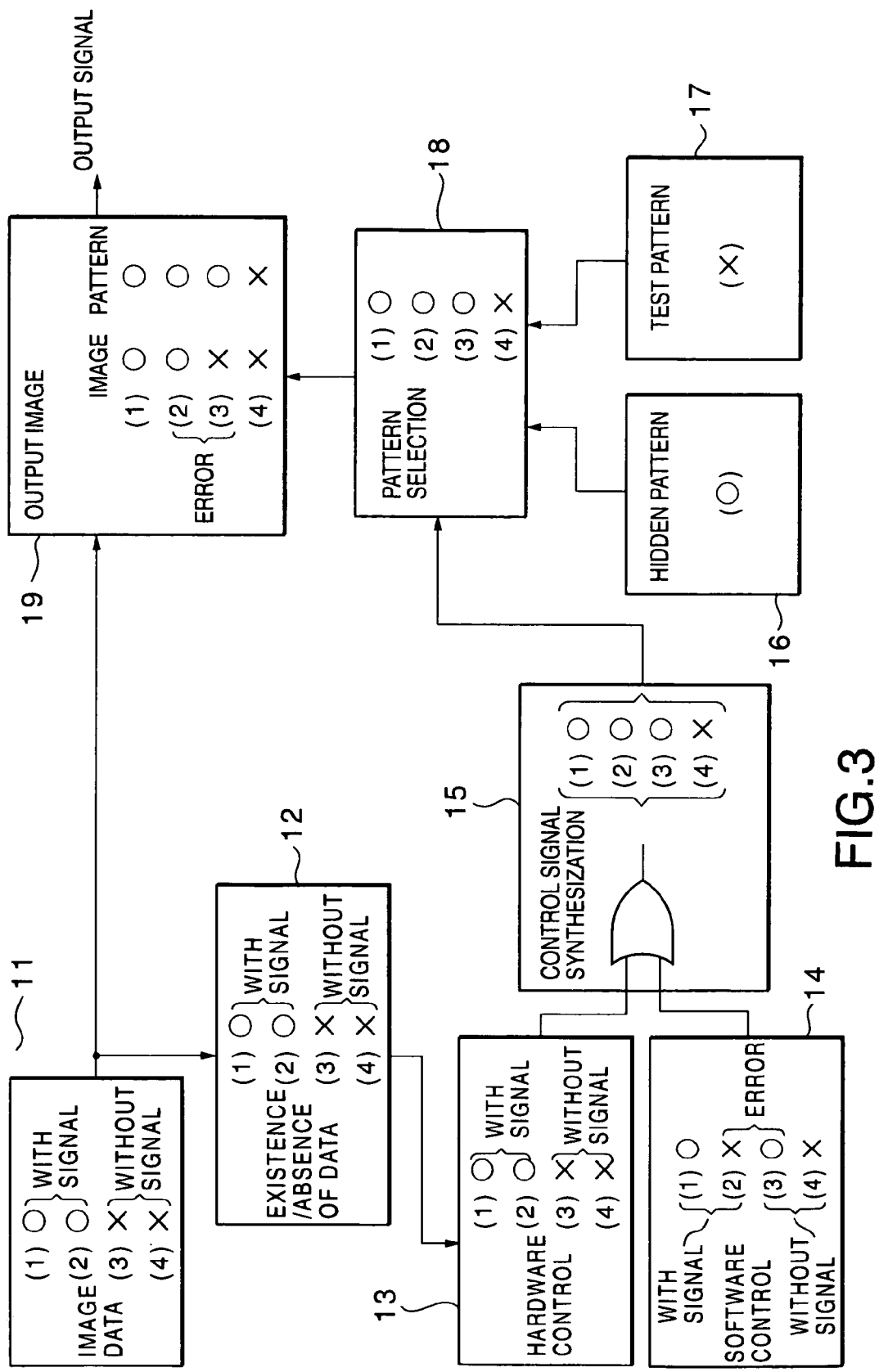
FIG. 3 is a block diagram for explaining a logical operation in the color image forming apparatus shown in FIG. 2.

Description will now be given as to the operation of the hidden pattern addition mechanism 10 in a color image forming apparatus according to the first embodiment having the above-described structure with reference to FIG. 3. FIG. 3 is a block diagram showing the operation of each constituent part illustrated in FIG. 2 and illustrates combinations of two states of the hardware control signal, i.e., a color image signal and the software control signal in each block. When the color image signal is supplied from the image data supplying means 11, the state "with signal (○)" is obtained as indicated by (1) and (2). When no color image signal is supplied, the state "without signal (.)" is obtained as indicated by (3) and (4).

On the other hand, the software control signal supplying means 14 also has the state "with signal (○)" as indicated by (1) and (3) and the state "without signal (X)" as indicated by (2) and (4). Here, as described above, since the hardware control signal compliments the erroneous operation when the software control signal includes an error due to a bug and the like, the software control signal controls so as to add a hidden pattern necessarily in the state of (1) when there is image data as in the states (1) and (2). Further, the software control signal may add a test pattern necessarily in the state of (4) in case of the states (3) and (4).

If the software control signal is not outputted as in (2) of the block (14) even though the image data is supplied as in (2) of the block 11 of FIG. 3 or if the control signal for adding a hidden pattern is outputted as in (3) of the block 14 despite the fact that the image data is not supplied as in (3) of the block 11, it can be said that the software control signal includes an error. According to the operation of the first embodiment in such a case, providing, e.g., an OR circuit as the control signal synthesizing means 15 causes a logical operation such as described in the block 15 to be executed, and the pattern selecting means 18 outputs a pattern in dependence upon the supplied control signal.

The image formation output signal synthesizing means 19, therefore, adds a hidden pattern as long as the image data exists even though the software control signal represents the state prohibiting addition of a hidden pattern due to an error, when the image data is supplied into the image forming apparatus as in the state of (2) in the block 19 depicted in FIG. 3. On the contrary, if the software control signal produces the control signal for adding a hidden pattern due to an error as in the state of (3) despite the fact that the image data is not supplied, a hidden pattern alone is added and outputted in spite of the fact that there is not image data. Since a hidden pattern is used for searching for important evidences of a crime, e.g., banknote forgery or preventing such a crime, a preferable result can be obtained if a hidden pattern is necessarily added when a color image is outputted and if a hidden pattern is added instead of or together with a test pattern taking security into consideration.

As described above, according to the hidden pattern addition mechanism in the color image forming apparatus of the first embodiment, a hidden pattern can be necessarily and assuredly added when a color image is supplied so that color image formation may be possibly performed, and specification of an apparatus can be facilitated when forgery is made to a medium and the like, e.g., a copied matter or printed matter on which a color image is formed.

Incidentally, although the above has described that the hidden pattern addition mechanism according the above-described first embodiment is provided with the OR circuit as an example of the control signal synthesizing means, any other type of the logical circuit may be provided to the control signal synthesizing means 15. Since it is often the case that an external yellow sub scanning direction image enabled signal (−YVDEN) in the actually used color image forming apparatus is a digital signal with a signal level of Low (L), a hidden pattern addition mechanism according to the second embodiment concerning this example will now be described with reference to FIGS. 4 and 5.

Figure 4:
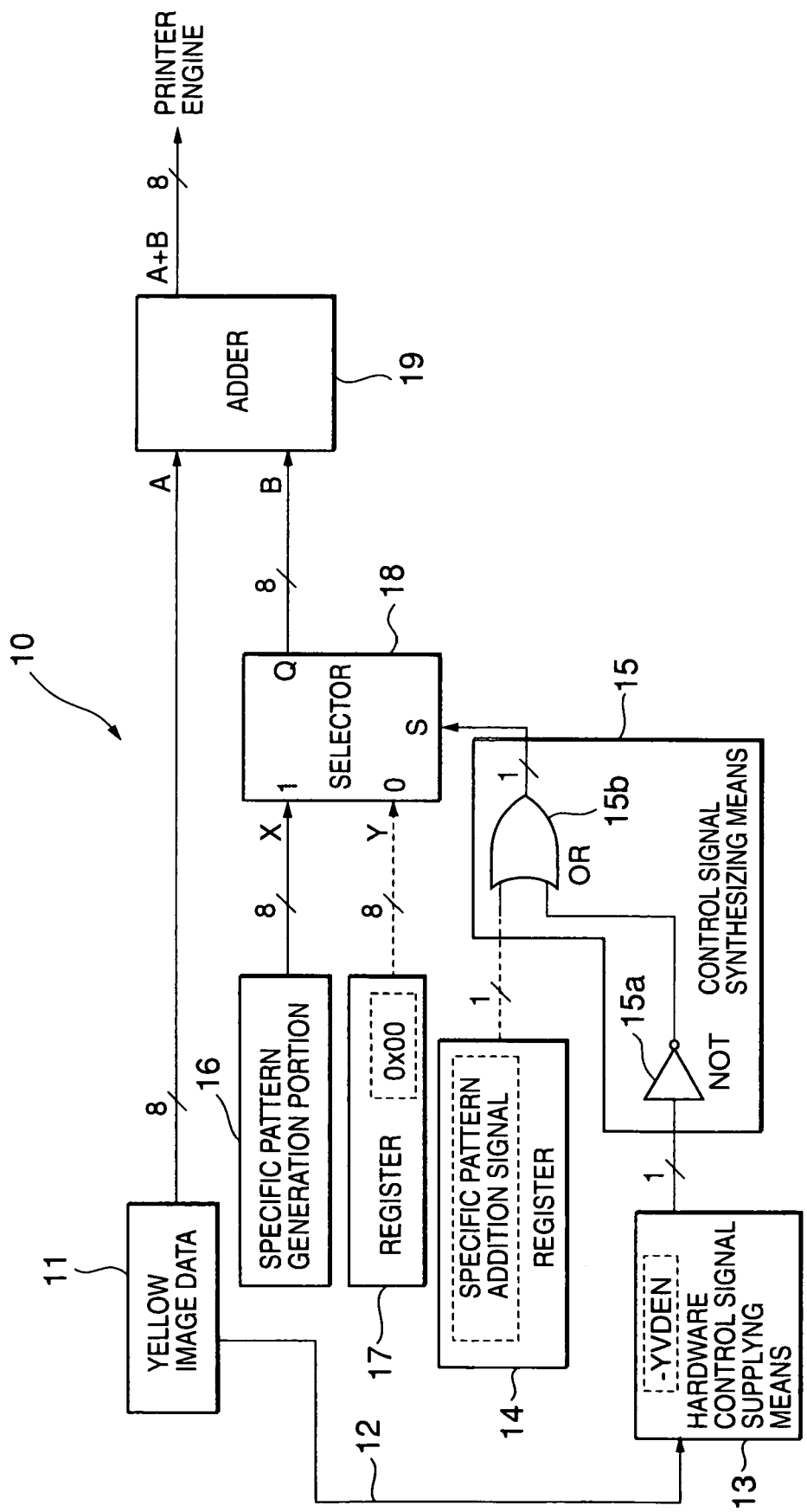
FIG. 4 is a block diagram showing a schematic structure of a hidden pattern addition mechanism in a color image forming apparatus according to a second embodiment of the present invention.

FIG. 4 is a block diagram showing a structure of the hidden pattern addition mechanism according to a second embodiment of the present invention. In the drawing, constituent parts with reference numerals equal to those in FIGS. 2 and 3 represent the constituent parts equal to or corresponding to the hidden pattern addition mechanism according to the first embodiment.

In FIG. 4, yellow image data 11 is supplied to the image forming apparatus. The yellow image data 11 is supplied to an adder 19 as the image formation output synthesizing means. A −YVDEN signal is an external yellow sub scanning direction image enabled signal inputted from outside. This is a signal generated in terms of hardware in such a manner that an image is outputted only when the signal level is at L. The external yellow sub scanning direction image enabled signal used herein is, however, a signal used only when a test pattern which causes no problem even though usual printing is carried out or a specific hidden pattern is added. Further, this signal is not used in outputting a test pattern which is inconvenient if the specific hidden pattern is added.

A specific pattern addition signal generated by a register 14 as the software control signal supplying means is a control signal set by software in this register 14. Incidentally, in the second embodiment, it is assumed that the specific pattern generation portion constantly operates when a power supply of the image forming apparatus is in the ON state or the effective image data is inputted to the selector. Here, the yellow sub scanning direction image enabled signal is a hardware control signal which is necessarily used for forming an image. As this signal, there are "an external yellow sub scanning direction image enabled signal" which is used for usual printing and "an internal yellow sub scanning direction image enabled signal" which is generated to be used in the printer engine when a part of a test pattern is outputted. As a control signal for adding a specific pattern, the above-described "external yellow sub scanning direction image enabled signal" is used.

Description will now be given on the operation based on the structure of FIG. 4 in two cases. In the first case, in outputting a test pattern which is inconvenient if a specific pattern is added, the external yellow sub scanning direction image enabled signal (−YVDEN) become "1" as described above. Further, the specific pattern addition signal is set to "0" by software. As a result:

1. "0" is outputted from an OR circuit 15*b*;

2. "0" is inputted to a control input S of a selector 18;

3. an input Y of the selector is selected;

4. "0" is outputted from an output Q of the selector;

5. "yellow image data" is inputted to an input A of the adder;

6. "0" is inputted to an input B of the adder; and

7. "yellow image data+0", i.e., "yellow image data" alone is outputted from an output the adder. In the first case, therefore, a specific hidden pattern is not added as expected, and a test pattern alone is outputted.

Next, description will now be given as to a second case for outputting a usual image or outputting a test pattern which is free from trouble even though a specific hidden pattern is added. In the second case, the external yellow sub scanning direction image enabled signal (−YVDEN) is "0". Further, a specific pattern addition signal is set to "1" by software. As a result:

1. "1" is outputted from the OR circuit 15*b*;

2. "1" is inputted to a control input S of the selector 18;

3. an input X of the selector is selected;

4. "a specific pattern" is outputted from an output Q of the selector;

5. "yellow image data" is inputted to the input A of the adder;

6. "the specific pattern" is inputted to the input B of the adder; and

7. "yellow image data+specific pattern" is outputted from an output of the adder. Therefore, the image data to which the specific hidden pattern is added is also outputted as expected in the second case.

Here, even if "0" is set to the specific pattern addition signal due to a problem in software despite the fact that the specific hidden pattern must be added, an output of the OR circuit in the second case becomes "1", and the specific pattern is consequently added.

In the above explanation of the second embodiment, the external yellow sub scanning direction image enabled signal is used as a control signal which is generated by hardware and necessarily used for forming an image during regular printing, but the present invention can also use a control signal for, e.g., a carriage motor for carrying paper as the image forming medium as well as the hardware control signal used for performing this type of image processing.

Figure 5:
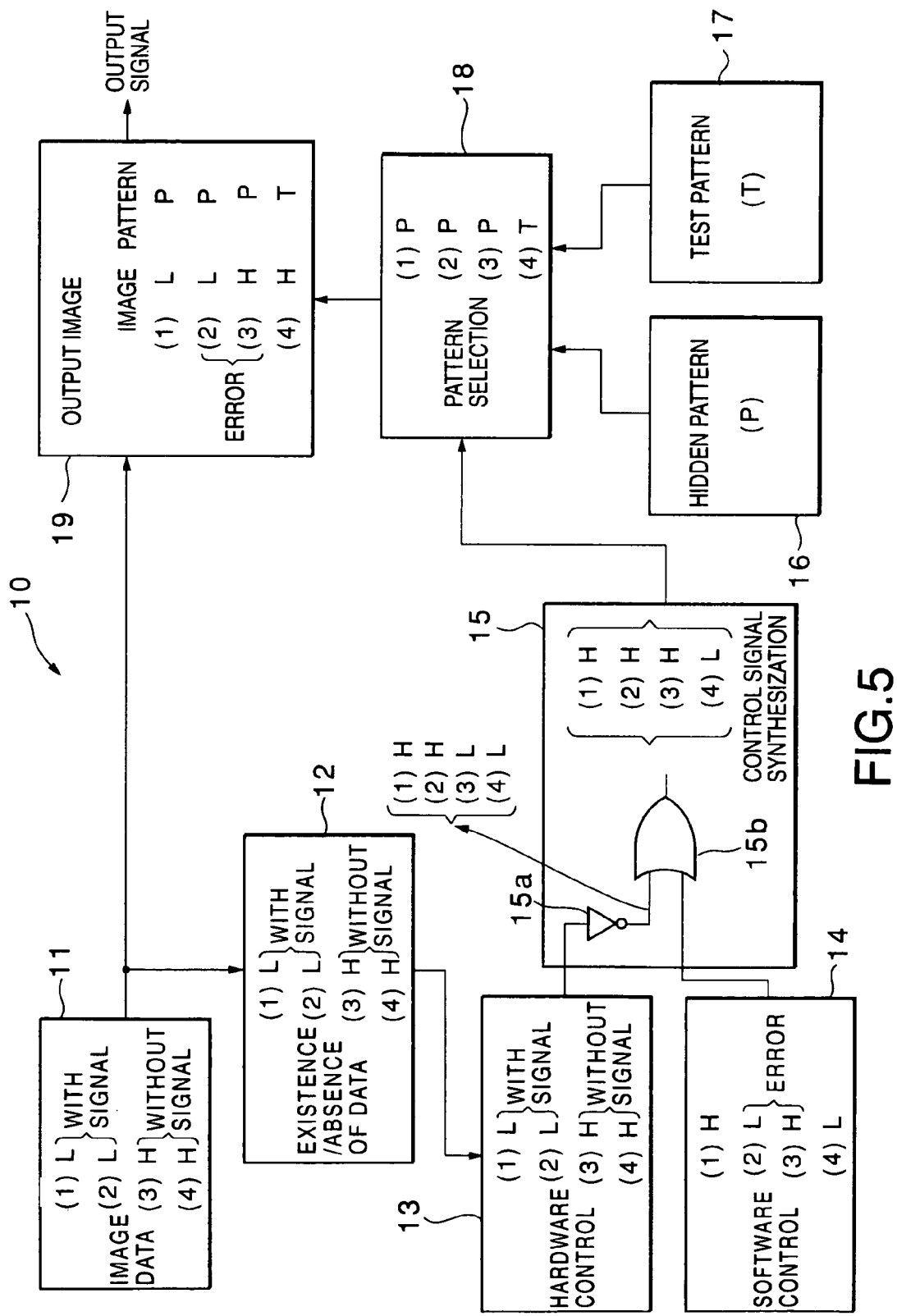
FIG. 5 is a block diagrams showing a hidden pattern addition mechanism according to a third embodiment, explaining the logical operation in the color image forming apparatus in FIG. 4 in association with FIG. 3.

A hidden pattern addition mechanism according to a third embodiment associated with the operation block of the first embodiment illustrated in FIG. 3 will now be described by using the same signal levels as those of the FIG. 4 respective constituent parts in the second embodiment with reference to FIG. 5. FIG. 5 is a block diagram showing the operation of each constituent part depicted in FIG. 2 applied to the signal levels in the second embodiment. In the drawing, combinations of two states of the hardware control signal, i.e., the color image signal and the software control signal are shown in blocks. When the color image signal is supplied from the image data supplying means 11, the state "with signal (L)" is obtained as indicted by (1) and (2). When no color image signal is supplied, the state "without signal (H)" is obtained as indicated by (3) and (4).

On the other hand, the software control signal supplying means 14 also has the state "with signal (L)" as indicate by (1) and (3) and the state "without signal (H)" as indicated by (2) and (4). Here, as described above, since the hardware control signal complements an erroneous operation when the software control signal includes an error due to a bug and the like, the software control signal executes control necessarily in the state (H) for adding a hidden pattern if the image data exists in the states (1) and (2). Further, in the states (3) and (4) where no image data is supplied, the software control signal may add a test pattern necessarily in the state (4).

If the software control signal is not outputted as in the state (2) of the block 14 even thought the image data is supplied as in the state (2) of the block 11 in FIG. 5, or if the control signal for adding a hidden pattern is outputted as in the state (3) of the block 14 despite the fact that the image data is not supplied as in the state (3) of the block 11, the software control signal includes an error. According to the operation of the third embodiment of the present invention in such a case, for example, providing an inverter (NOT circuit) 15*a* and an OR circuit 15*b* as the control signal synthesizing means 15 causes a logical operation such as described in the block 15 to be executed, and the pattern selecting means 18 outputs a pattern according to the control signal.

The image formation output signal synthesizing means 19, therefore, adds a hidden pattern as long as the image data exists even though the software control signal represents the state for adding no hidden pattern due to an error, when the image data is supplied into the image forming apparatus as in the state (2) in the block 19 of FIG. 3. On the contrary, when the software control signal outputs the control signal for adding a hidden pattern due to an error as in the state (3) despite the fact that the image data is not supplied, the hidden pattern alone is added and outputted in spite of absence of the image data. Since a hidden pattern is used for searching for important evidences of a crime, e.g., banknote forgery or preventing such a crime, a preferable result can be obtained if a hidden pattern is necessarily added when a color image is outputted and if a hidden pattern is added instead of or together with a test pattern taking security into consideration.

In this manner, a hidden pattern can be also necessarily and assuredly added by the hidden pattern addition mechanism in the color image forming apparatus according to the third embodiment when the color image is supplied so that color image formation may be possibly performed, and specification of an apparatus can be facilitated when forgery is made to a medium and the like, e.g., a copied matter or printed matter on which a color image is formed.

As described above in detail, the hidden pattern addition mechanism according to the present invention is not used in case of outputting a test pattern which is inconvenient in adding a specific pattern as a control signal for adding a specific hidden pattern. Further, even if no addition of a specific pattern is set in terms of software due to problem in software, a hidden pattern can be necessarily added by a control signal synthesized by the control signal synthesizing means 15 which synthesize the hardware control signal which is necessarily used only for forming an image during regular printing and the software control signal, thereby attaining improvement in security in the image forming apparatus.

What is claimed is:

1. An image forming apparatus for forming an image on an image forming medium and capable of forming a specific hidden pattern for specifying an apparatus at a specific position on said medium, said image forming apparatus comprising: hardware control signal supplying means for generating and supplying a hardware control signal which is necessarily generated for an image and which represents that data exists when color image data exists in the image forming apparatus, said hardware control signal including an external signal which is used for usual printing and an internal signal which is generated to be used in said printer engine when a part of a test pattern is outputted;

software control signal supplying means for generating and supplying a software control signal for determining whether said specific hidden pattern is added to a color image; and specific hidden pattern control synthesizing means for adding said specific hidden pattern on an output image when either said external signal of said hardware control signal or said software control signal is detected, and for not adding said specific hidden pattern on the output image when said internal signal of said hardware control signal is detected.

2. The image forming apparatus according to claim 1, further comprising:

image data supplying means for supplying color image data;

data existence/absence confirming means for confirming the existence/absence of image data in said image forming apparatus;

wherein said hardware control signal supplying means generates and supplies said hardware control signal based on the existence/absence of image data confirmed by said confirming means;

wherein said software control signal supplying means generates and supplies said software control signal for adding said specific hidden pattern;

wherein said control signal synthesizing means synthesizes said control signal in such a manner that said specific hidden pattern is necessarily formed on a color image when a usual image is formed on said image forming medium based on said hardware control signal and said software control signal;

hidden pattern generating means for generating said specific hidden pattern;

test pattern generating means for generating and outputting a test pattern when a color image is not formed;

pattern selecting means for selecting and outputting one of said specific hidden pattern and said test pattern based on said control signal synthesized by said control signal synthesizing means; and image formation output signal synthesizing means which synthesizes said color image data supplied from said image data supplying means and said specific hidden pattern selected by said pattern selecting means when said image data is inputted and which outputs said test pattern selected by said pattern selecting means when said color image data is not inputted.

3. The image forming apparatus according to claim 2, wherein said hardware control signal generated by said hardware control signal supplying means is a signal which affects the addition of said specific hidden pattern and which avoids the normal formation of a usual image when said signal is abnormal.

4. The image forming apparatus according to claim 3, wherein said hardware control signal is generated by software when said signal is set.

5. The image forming apparatus according to claim 2, wherein said specific hidden pattern generated by said hidden pattern generating means is a special pattern formed by using colors or patterns which are hard to be identified by the naked eye in such a manner that a body of an image forming apparatus which has formed an image is specified from a reproduced image on said medium, even if a specific original which must not be inherently formed is formed on said medium.

6. The image forming apparatus according to claim 2, wherein said data existence/absence confirming means generates said hardware control signal for said hardware control signal supplying means, when image data is supplied from said image data supplying means.

7. The image forming apparatus according to claim 2, wherein said control signal synthesizing means comprises an OR circuit for calculating the logical OR of said hardware control signal supplied from said hardware control signal supplying means and said software control signal supplied from said software control signal supplying means, and outputs a control signal by which a specific hidden pattern is necessarily added to an image when one of said hardware control signal and said software control signal is supplied.

8. The image forming apparatus according to claim 2, wherein said pattern selecting means comprises a selector for selecting said specific hidden pattern generated by said hidden pattern generating means with said control signal for adding said specific hidden pattern to an output image as a selected input by said control signal synthesizing means.

9. The image forming apparatus according to claim 2, said image formation output signal synthesizing means outputs to a printer engine an image formation signal by which a hidden pattern using a predetermined color or pattern is added at a predetermined position of an image to be formed by adding said specific hidden pattern supplied from said pattern selecting means to said image data supplied from said image data supplying means.

10. The image forming apparatus according to claim 2, wherein said image data supplying means comprises a yellow data supplying apparatus for supplying yellow image data to each of said image formation output signal synthesizing means and said hardware control signal supplying means.

11. The image formation apparatus according to claim 2, wherein said hardware control signal supplying means comprises a −YVDEN output portion which outputs an external yellow sub scanning direction image enabled signal (−YVDEN) based on said yellow image data.

12. The image forming apparatus according to claim 11, wherein said control signal synthesizing means comprises a NOT circuit which inverts said external yellow sub scanning direction image enabled signal (−YVDEN) outputted from said YVDEN output portion as said hardware control signal supplying means and an OR circuit for calculating the logical OR of an output from said NOT circuit and an output signal from a specific pattern addition signal generating register as said hardware control signal supplying means.

13. The image forming apparatus according to claim 11, wherein said data existence/absence confirming means generates a hardware control signal in said hardware control signal supplying means based on a control signal for controlling drive of a paper carrying motor for carrying paper as said image forming medium.

14. The image forming apparatus according to claim 11, wherein said pattern selecting means comprises a selector for selecting said specific hidden pattern generated by said hidden pattern generating means with said control signal by which said specific hidden pattern is added to an output image by said control signal synthesizing means as a selected input.

15. The image forming apparatus according to claim 14, wherein said hidden pattern generating means comprises a specific pattern generating portion for generating a specific hidden pattern.

16. The image forming apparatus according to claim 11, wherein said image formation output signal synthesizing means comprises an adder which outputs to a printer engine an image formation signal by which a hidden pattern using a predetermined color or pattern is added at a predetermined position of an image to be formed by adding said image data supplied from said image data supplying means and said specific hidden pattern supplied from said pattern selecting means.

17. An image forming apparatus for forming an image on an image forming medium and capable of forming a specific hidden pattern for specifying an apparatus at a specific position on said medium, said image forming apparatus comprising:

a hardware control signal supplying unit that generates and supplies a hardware control signal which is necessarily generated for forming an image and which represents that data exists when color image data exists in the image forming apparatus, said hardware control signal including an external signal which is used for usual printing and an internal signal which is generated to be used in said printer engine when a part of a test pattern is outputted;

a software control signal supplying unit that generates and supplies a software control signal for determining whether said specific hidden pattern is added to a color image; and specific hidden pattern control synthesizing unit that adds said specific hidden pattern on an output image when either said external signal of said hardware control signal or said software control signal is detected, and that does not add said specific hidden pattern on the output image when said internal signal of said hardware control signal is detected.

* * * * *